(12) United States Patent
Klausner et al.

(10) Patent No.: US 12,027,828 B2
(45) Date of Patent: Jul. 2, 2024

(54) METHOD FOR MANUFACTURING AN ASSEMBLY FOR A SPARK PLUG AND SPARK PLUG

(71) Applicant: INNIO Jenbacher GmbH & Co OG, Jenbach (AT)

(72) Inventors: Johann Klausner, St. Jakob i.H. (AT); Robert Grabner, Pogier (AT); Rafal Pyszczek, Warsaw (PL)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/011,190

(22) PCT Filed: Jun. 18, 2020

(86) PCT No.: PCT/AT2020/060248
§ 371 (c)(1),
(2) Date: Dec. 18, 2022

(87) PCT Pub. No.: WO2021/253061
PCT Pub. Date: Dec. 23, 2021

(65) Prior Publication Data
US 2023/0246425 A1 Aug. 3, 2023

(51) Int. Cl.
*H01T 21/02* (2006.01)
*B23K 26/14* (2014.01)
(Continued)

(52) U.S. Cl.
CPC .............. *H01T 21/02* (2013.01); *B23K 26/14* (2013.01); *B23K 26/24* (2013.01); *H01T 13/20* (2013.01)

(58) Field of Classification Search
CPC ......... H01T 21/02; H01T 13/20; H01T 13/39; B23K 26/14; B23K 26/24
See application file for complete search history.

(56) References Cited

U.S. PATENT DOCUMENTS

| | | | |
|---|---|---|---|
| 3,356,882 A | 12/1967 | Hallauer et al. | |
| 4,575,343 A | 3/1986 | Kin et al. | |
| 8,348,709 B1 * | 1/2013 | Passman | H01T 21/02 |
| | | | 445/7 |

FOREIGN PATENT DOCUMENTS

| | | |
|---|---|---|
| DE | 102014226226 A1 | 6/2016 |
| EP | 0549368 A2 | 6/1993 |

(Continued)

OTHER PUBLICATIONS

Machine translation of DE 102014226226 A1 (Year: 2016).*
PCT International Search Report and Written Opinion; Application No. PCT/AT2020/060248; dated Mar. 9, 2021; 9 pages.

*Primary Examiner* — Anne M Hines
*Assistant Examiner* — Jose M Diaz
(74) *Attorney, Agent, or Firm* — Fletcher Yoder, P.C.

(57) ABSTRACT

A method for manufacturing an assembly of a center pin and a middle electrode carrier or a middle electrode, respectively, for a spark plug, which spark plug can be used for igniting a combustible air-fuel-mixture in an internal combustion engine, wherein—
a piece of wire or rod is provided having, preferably over its length, a core of a first material which is surrounded by an outer layer of a second material, the second material being different from the first material, wherein the core is exposed at one end of the piece of wire or rod;
a middle electrode carrier or a middle electrode, respectively, is provided at said one end of the piece of wire or rod;
a high energy beam, preferably a laser beam, is directed to the exposed core and a powder is melted onto the exposed core by the high energy beam such that in a contact region of the powder and the exposed core a microstructure composed of material of the core and (Continued)

powder is formed after resolidification of the material of the core and the powder and the core is covered by resolidified powder at the one end of the piece of wire or rod.

27 Claims, 8 Drawing Sheets

(51) Int. Cl.
*B23K 26/24* (2014.01)
*H01T 13/20* (2006.01)

(56) References Cited

FOREIGN PATENT DOCUMENTS

| EP | 0859436 A1 | 8/1998 |
| EP | 3068001 A1 | 9/2016 |
| EP | 3373402 A1 | 9/2018 |

\* cited by examiner

METHOD FOR MANUFACTURING AN ASSEMBLY FOR A SPARK PLUG AND SPARK PLUG

CROSS-REFERENCE TO RELATED APPLICATION

This application is a National Stage entry from, and claims benefit of, PCT Application No. PCT/AT2020/060248, filed on Jun. 18, 2020; entitled "METHOD FOR MANUFACTURING AN ASSEMBLY FOR A SPARK PLUG AND SPARK PLUG", which is herein incorporated by reference in its entirety.

BACKGROUND

The subject matter disclosed herein relates to a method for manufacturing an assembly of a center pin and a middle electrode carrier or a middle electrode, respectively, for a spark plug. The subject matter disclosed herein also relates to a method for manufacturing a spark plug, an assembly of a center pin and a middle electrode carrier for a spark plug, and a spark plug with such an assembly.

Spark plugs are known in various embodiments from the state of the art. Due do the efforts of improved lifetime requirements, the requirements regarding gas tightness and temperature management, i.e., enabling proper heat transfer between the spark plugs on the one hand and the cylinder head or the spark plug sleeves on the other hand, became more important.

Known spark plugs have a middle electrode, which referring to a longitudinal axis of the spark plug, is arranged centrally, and at least one mass electrode radially distanced from said middle electrode. An ignition gap is formed between abutting areas (ignition areas) of the middle electrode and the at least one mass electrode.

It is known to form the middle electrode in at least two parts, wherein the ignition area is formed by a body of precious metal arranged on a middle electrode carrier. The respective body of precious metal is connected by a welded joint to the mass electrode carrier and the middle electrode carrier, respectively. Such a spark plug is disclosed, e.g., by EP 0 859 436 A1 or EP 3 068 001 A1.

Spark plugs are manufactured, for example, by a laser welding process.

Spark plugs are exposed to high temperatures and pressures during operation of the combustion engine, because at least one part of a spark plug is directly in contact with the combustion chamber and therefore with the combustion process. Over time this leads to removal of electrode material and, therefore, to a reduction in lifetime. Another disadvantage of spark plugs known from the prior art are changes in the region of the face side and face area, respectively, of the electrodes, in particular of the spark plug pin and the body of precious metal which face the combustion chamber (in direction of ignition) which are caused by hot corrosion or oxidation.

Spark plugs are mounted in a cylinder head or a spark plug sleeve of an internal combustion engine, in a manner that an ignition means is arranged at an end of the spark plug facing the combustion chamber, by screwing a male screw portion (or external thread) of a spark plug body, which at least partially surrounds the ignition means, into the female screw portion on the cylinder head or the spark plug sleeve.

Heat is transferred to the spark plug from the combustion in the combustion chamber, which heat is dissipated over the external thread to the cylinder head or spark plug sleeve. Therefore, it is important to have a certain thermal conductivity between the external thread and the cylinder head or spark plug sleeve as it is well known that insufficient heat dissipation leads to reduced lifetimes of spark plugs.

In the prior art, it was tried to arrange the spark plug as far as possible outside the combustion chamber which, however, results in a disadvantage that a spark position of the spark plug is not arranged as far in the combustion chamber as would be necessary for an adequate ignition of an air-fuel-mixture.

A further strategy of the prior art consists in dissipating into the cylinder head (often using a spark plug sleeve) as quickly and fully as possible the amount of heat which is introduced into the components of the spark plug. To this end, middle electrode carriers often have a core of material with good thermal conductivity, such as, for example, Copper. To protect the core, it is embedded into a material with good resistance against hot corrosion, such that the core is shielded from combustion gases (cf. U.S. Pat. No. 4,575,343 A). The assembly of core and shielding material is called a center pin.

Manufacturing a center pin, for example, by pressing Copper into a Nickel pin by cold forming as described in U.S. Pat. No. 4,575,343 A, is expensive and the lifetime of spark plugs with such a center pin is often unsatisfactory. A different way of manufacturing a center pin is shown in U.S. Pat. No. 3,356,882 A, in which a plurality of electrode rods consisting of a copper core and a mantel of Inconel is welded to an Inconel strip. Using a punch, capped electrodes are sheared from the Inconel strip.

With respect to both prior art manufacturing techniques, the exact position of the copper core is not controllable, leading to unknown thermal behavior and thus to accidentally varying lifetime of the spark plug.

BRIEF DESCRIPTION

The embodiments disclosed herein provide a method for manufacturing an assembly of a center pin and a middle electrode carrier or middle electrode, respectively, for a spark plug. In addition, the embodiments disclosed herein provide a method for manufacturing a spark plug having an assembly of a center pin and a middle electrode carrier or middle electrode, respectively, for a spark plug. The embodiments disclosed herein also provide a spark plug with such an assembly, wherein the resulting assembly and spark plug, respectively, are easier to manufacture and, preferably, have increased lifetime.

The foregoing embodiments are achieved by a method for manufacturing an assembly for a spark plug, a method for manufacturing a spark plug comprising such a method, an assembly for a spark plug, and a spark plug with such an assembly as discussed in detail below. Some advantageous embodiments of the invention are defined in the claims.

An embodiment of the invention provides for a method for manufacturing an assembly of a center pin and a middle electrode carrier or a middle electrode, respectively, for a spark plug, which spark plug can be used for igniting a combustible air-fuel-mixture in an internal combustion engine, characterized in that:
  a piece of wire or rod is provided having, preferably over its length, a core of a first material which is surrounded by an outer layer of a second material, the second material being different from the first material, wherein the core is exposed at one end of the piece of wire or rod;

a middle electrode carrier or a middle electrode, respectively, is provided at said one end of the piece of wire or rod;

a high energy beam, preferably a laser beam, is directed to the exposed core and a powder is melted onto the exposed core by the high energy beam, such that in a contact region of the powder and the exposed core, a microstructure composed of material of the core and powder is formed after resolidification of the material of the core and the powder and the core is covered by resolidified powder at the one end of the piece of wire or rod.

It should be noted that the second and the third step of the above steps do not have to be done in the given order. As will be explained below, it is even possible that the provision of the middle electrode carrier or the middle electrode, respectively, is done by providing the melted powder such that there is no distinct second or third step.

The technique of melting a powder by a high energy beam (usually a laser beam) onto a given surface is well known in the art (usually called laser metal deposition). For an embodiment of the present invention, it is preferred that the powder is injected by a powder nozzle into the laser beam. However, it would also be possible first to apply the powder to the surface and then to apply the laser beam onto to powder on the surface to melt it. Application and melting of the powder can be done in layers, such that new powder is melted onto a layer of resolidified powder.

Using a piece of wire or rod having, preferably over its length, a core of a first material which is surrounded by an outer layer of a second material, the second material being different from the first material has the advantage that since at the one end of the piece of wire or rod at which the core is exposed, in a plane perpendicular to the extension of the wire or rod, the material of the core and the material of the outer layer form a plane surface. It is possible to attach the middle electrode carrier or the middle electrode itself (with or without removing material from said plane surface) onto said plane surface or to an outer layer of the wire or rod. This is advantageous because, by choosing the extension of the middle electrode carrier or of the middle electrode perpendicular to said plane surface, a distance between said plane surface (and therefore of the material of the core) and a seat of the middle electrode carrier for the middle electrode or the middle electrode itself can be chosen in a reproducible way. The resolidified powder servers to prevent conditions in the combustion chamber to wear away the core by sealing the exposed surface of the core. Due to the contact region, in which there is an intimate contact between the resolidified powder and the material of the core, heat from the combustion chamber can be efficiently transferred from the resolidified powder via the contact area into the core of the center pin.

In a first variant according to an embodiment of the invention. it is possible that the middle electrode carrier or the middle electrode, respectively, is attached to (preferably welded to) the center pin independently from applying the powder, such that the powder serves to seal the material of the core and, possibly, a weld seam between the middle electrode carrier or the middle electrode, respectively, and the center pin, but does not itself form (part of) the middle electrode carrier or the middle electrode, respectively.

In a second variant according to an embodiment of the invention, the middle electrode carrier or the middle electrode, respectively, can be built (at least partially) by the application of the powder, such that the resolidified powder forms (at least part of) the middle electrode carrier or the middle electrode, respectively (and, of course, seals the exposed core).

Preferably, in certain embodiments, the middle electrode is made of precious metal, in particular, the middle electrode is a platelet consisting of precious metal.

An embodiment of the invention also provides for an assembly of a center pin and a middle electrode carrier or a middle electrode, respectively, for a spark plug which spark plug can be used for igniting a combustible air-fuel-mixture in an internal combustion engine, wherein:

the center pin comprises a piece of wire or rod having, preferably over its length, a core of a first material which is surrounded by an outer layer of a second material, the second material being different from the first material;

the middle electrode carrier or the middle electrode, respectively, is attached to one end of the piece of wire or rod;

the core of the center pin is covered by a material which was provided in form of melted powder and was resolidified, such that in a contact region of the resolidified powder and the core, a microstructure composed of material of the core and powder exists.

Protection is also sought for a spark plug comprising such an assembly.

Use of a piece of wire or rod simplifies manufacture of an assembly of a center pin and a middle electrode carrier or a middle electrode, respectively, for a spark plug and of a spark plug having such an assembly without a reduction in lifetime or even showing an increased lifetime.

Wires or rods of a type usable for embodiments of the invention can be obtained commercially, for example, in the form of so-called clad wires or clad rods which are a combination of two materials in the form of a wire or rod (e.g., Nickel Clad Copper wires or rods).

Alternatively, they can be easily produced by using a wire or rod with a hollow core made of the second material into which a wire or rod made of the first material is drawn. In order to ensure a tight fit, this assembly can be drawn producing said wire or rod with a core of the first material which is surrounded by an outer layer of the second material.

The piece of wire or rod can be obtained with a desired length or can be provided with such a length that several pieces with a desired length can be obtained, e.g., by cutting a longer piece of wire or rod. If necessary, the one end of the wire or rod onto which the body is to be attached or formed on can be conditioned before attaching or forming said body, e.g., by grinding, turning, milling, grinding and/or polishing an end face of the wire or rod.

The core should be completely covered by the resolidified powder in order to seal it against the combustion chamber to protect it from combustion gases. It is advantageous if the core is completely covered by the resolidified powder.

A preferred embodiment of the invention provides that said step of providing a middle electrode carrier at said one end of the piece of wire or rod comprises a step in which a body (preferably, said body consists of at least one metal such as Nickel) is attached to or formed on said one end of the piece of wire or rod which body:

either forms the middle electrode carrier, or serves as an intermediate product for the middle electrode carrier wherein the middle electrode carrier is obtained from the intermediate product by at least one further manufacturing step.

This preferred embodiment envisions in a first alternative that the body which is to be attached to or formed on said one end of the piece of wire or rod directly forms the middle electrode carrier which is ready for mounting the middle electrode. In this case, the body can be manufactured with the desired dimensions independently from the piece of wire or rod. The body can have a shoulder which can be a part of or can form a totality of a mounting surface for a middle electrode to be attached to the middle electrode carrier.

In a second alternative, this preferred embodiment envisions that the body, which is to be attached to or formed on said one end of the piece of wire or rod, serves as an intermediate product for the middle electrode carrier, wherein the middle electrode carrier is obtained from the intermediate product by at least one further manufacturing step. In this case, the body indirectly forms the middle electrode carrier in the sense that at least one further manufacturing step, possibly several manufacturing steps, is or are necessary to obtain the middle electrode carrier which is ready for mounting a middle electrode.

In this second alternative, the body could be attached (e.g., by welding, preferably laser beam welding) in one piece to the said one end of the wire or rod and the at least one further step could be performed after attaching the body. It is, however, preferred in some embodiments, that a powder deposition technique is used for forming the body on said end of the piece of wire or rod.

In a first embodiment of such a powder deposition technique, the body is manufactured in at least one layer such that for each layer a powder is deposited on said one end of the piece of wire or rod and melted—preferably by a high energy beam (e.g., a laser beam or an electron beam)—and resolidifies to form the at least one layer.

In a second embodiment of such a powder deposition technique, a laser beam is directed to said one end of the piece of wire or rod to melt its surface and a powder is introduced into the welded joint the surface of which has been melted by the laser beam such that the powder melts and is connected with the melted surface. Powder is deposited until the body is manufactured.

As a powder, a corrosion-resistant Nickel powder (e.g., available under the trade names Inconel 600® or Inconel 625®) or other powder material suitable for laser material deposition processes is preferably used.

With respect to both, the first alternative (body directly forming middle electrode carrier) and the second alternative (body serves as intermediate product) of the preferred embodiment, it can be provided that the body is of a larger dimension with respect to at least one direction, preferably with respect to a longitudinal axis of the wire or rod, and that said further manufacturing step for obtaining the middle electrode carrier from the intermediate product comprises at least one step in which material is removed from the body to obtain a body with reduced dimensions, preferably with dimensions corresponding to the ones of the middle electrode carrier.

With respect to both, the first and the second alternative of the preferred embodiment, it can be provided that said further manufacturing step for obtaining the middle electrode carrier from the intermediate product comprises at least one step in which a shoulder is formed on the body. This shoulder can be a part of or can form a totality of a mounting surface for a middle electrode to be attached to the middle electrode carrier.

In a preferred embodiment, which can be combined with each of the aforementioned embodiments, a mounting surface of the middle electrode carrier for a middle electrode has a pre-defined distance to the core with respect to a longitudinal axis of the wire or rod. By choosing a specific pre-defined distance, e.g., at least 0.05 mm, preferably more than 0.1 mm, most preferred more than 0.2 mm, it is possible to obtain in a reproducible way a spark plug, which in operation has a middle electrode with a lower temperature than in the prior art. In order to ensure good heat dissipation, the distance between middle electrode a core of the wire or rod should be as small as possible. However, in order to protect the core from the conditions in the combustion chamber, that distance should not be too small. With this embodiment of the invention, an optimal pre-defined distance can be found (e.g., by way of experimental test series trying different distances and observing the resulting temperatures or by way of calculations or computer simulations) and spark plugs with this distance can be reproducibly manufactured.

With respect to this embodiment, it is possible to control the distance between the core of the first material and the material covering the core (in other words to control the distance from the mounting surface of the middle electrode carrier to the core). Compared to the prior art, it is possible to have a smaller distance improving heat transfer while still ensuring that the distance is large enough to protect the core material.

It is, for example, possible to measure a length of the piece of wire or rod before applying the body from one end to the other end. Using this information, it is then possible—after applying the body—to remove as much material as needed from the body to obtain the desired pre-defined distance. Alternatively or additionally, the one end of the piece or rod could be provided with a marking.

Assemblies and spark plugs manufactured according to this embodiment of the invention show, during operation in a combustion engine, increased heat transfer from the middle electrode into the cylinder head leading to reduced temperatures of the middle electrode and therefore to an increased lifetime. They are enabled for higher power densities inside the combustion chamber.

By way of example, a temperature of the middle electrode was found to be reduced by 80-100° C. compared to the prior art.

By way of example, such spark plugs are enabled for a power density above 22 bar BMEP.

By way of example, said pre-defined distance from the mounting surface of the middle electrode carrier to the core can be obtained by using a body which is of a larger dimension at least with respect to the longitudinal axis of the wire or rod (e.g., as provided by way of one of the aforementioned embodiments), and material of the body is removed (e.g., by cutting, turning or grinding) along a direction parallel to the longitudinal axis of the wire or rod such that said pre-defined distance forms. Alternatively, it would of course be possible to form a body which when combined with the wire or rod already has the desired distance.

In an embodiment of the invention, a piece of wire or rod (preferably a clad wire) is used with a core consisting of material with a higher thermal conductivity than that of the outer layer, the core preferably comprising or consisting of Copper or a Copper alloy. Other materials with high thermal conductivity could be used such as silver or gold.

In an embodiment of the invention, a piece of wire or rod (preferably a clad wire) is used with an outer layer consisting of a material with a higher resistance against hot corrosion than that of the core, the outer layer preferably comprising or consisting of Nickel or a Nickel alloy.

In an embodiment of the invention, the middle electrode carrier comprises or consists of a metal, preferably Nickel.

In order to ensure good functionality of the center pin, i.e., the wire or rod with the body (which acts as a middle electrode carrier), it is envisioned in one embodiment that there is a layer with a minimum thickness on the front end of the core. The layer thickness could be at least 0.05 mm, preferably at least 0.1 mm. In some embodiments, said layer could have a thickness of at least 0.2 mm.

An embodiment of the spark plug further comprises:
an ignition means arranged at an end of the spark plug facing the combustion chamber, when the spark plug is mounted in the internal combustion engine, said ignition means comprising the middle electrode and the ground electrode.
a wall, which preferably at least partially surrounds the ignition means, and
a sealing area, which is used for sealing the combustion chamber against the environment,
wherein the wall comprises the sealing area located at an end of the wall, which end faces the combustion chamber when the spark plug is mounted in the internal combustion engine, wherein it is preferred that the sealing area is a terminal portion of the wall, which terminal portion faces the combustion chamber, when the spark plug is mounted in the internal combustion engine and in particular that the sealing area is designed as a chamfer. It has to be noted, however, that embodiments of the invention can be used with all types of spark plugs irrespective of the type of sealing.

It should be understood that structural features of the spark plug or any component thereof which are discussed with respect to an inventive method are also intended to refer to the assembly or the spark plug.

BRIEF DESCRIPTION OF THE DRAWINGS

Further details and advantages of the invention are apparent from the accompanying figures and the following description of the drawings. The figures show:

FIG. 3*c,d* is a sectional view of another embodiment of the invention and a detail view thereof.

DETAILED DESCRIPTION

Figure 1:
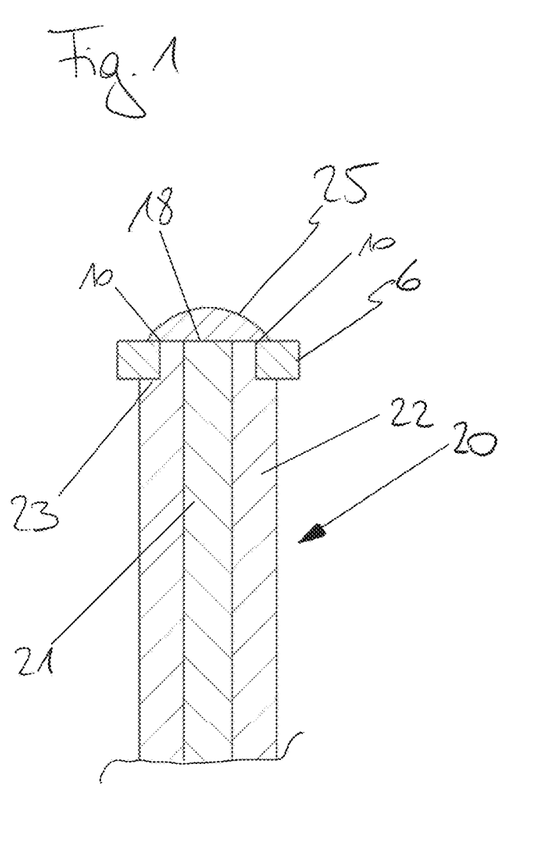
FIG. 1 is a sectional view of an embodiment of an assembly according to the invention and manufactured by an embodiment of an inventive method.
Figure 2:
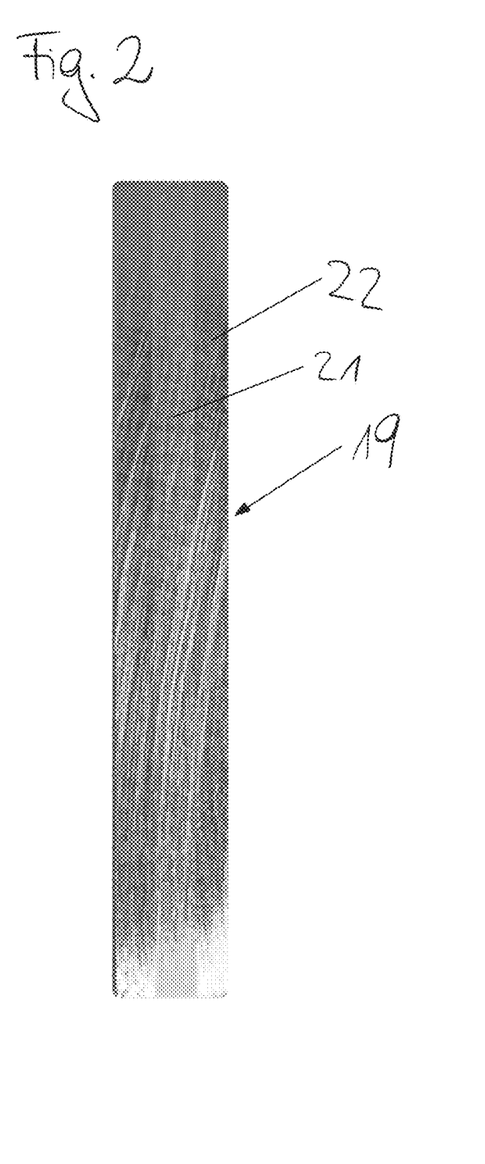
FIG. 2 is a sectional view of a piece of wire or rod suitable for an assembly according to an embodiment of the invention and manufactured by an embodiment of an inventive method.

FIG. 1 shows a sectional view of an embodiment of an assembly according to the invention and manufactured by an embodiment of an inventive method comprising a center pin 20 made of a piece 19 of wire or rod having over its length, a core 21 of a first material which is surrounded by an outer layer 22 of a second material (cf. FIG. 2 which shows a sectioned view of such a piece 19 of wire or rod), the second material being different from the first material. In this embodiment, the middle electrode 6 is welded to an end of the piece 19 of wire or rod, preferably onto a shoulder cut into the outer layer 22. A high energy beam, preferably a laser beam, was directed to the exposed core 21 and a powder was melted onto the exposed core 21 by the high energy beam such that in a contact region 18 of the powder and the exposed core 21 a microstructure composed of material of the core 21 and powder was formed after resolidification of the material of the core 21 and the powder and the core 21 is covered by resolidified powder 25 at the one end of the piece 19 of wire or rod. In this embodiment, the resolidified powder 25 covers also the weld seam 10 present between the middle electrode 6 and the outer layer 22.

Figure 3A:
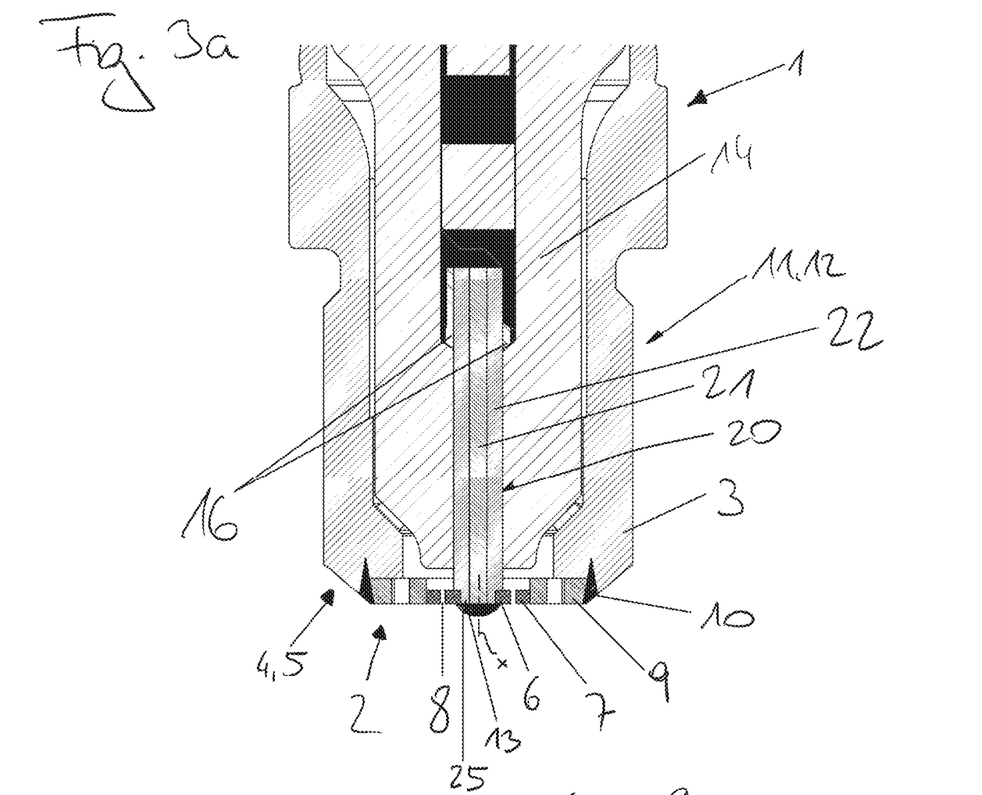
FIG. 3*a,b* is a sectional view and a sectional isometric view of a spark plug according to an embodiment of the invention.
Figure 3B:
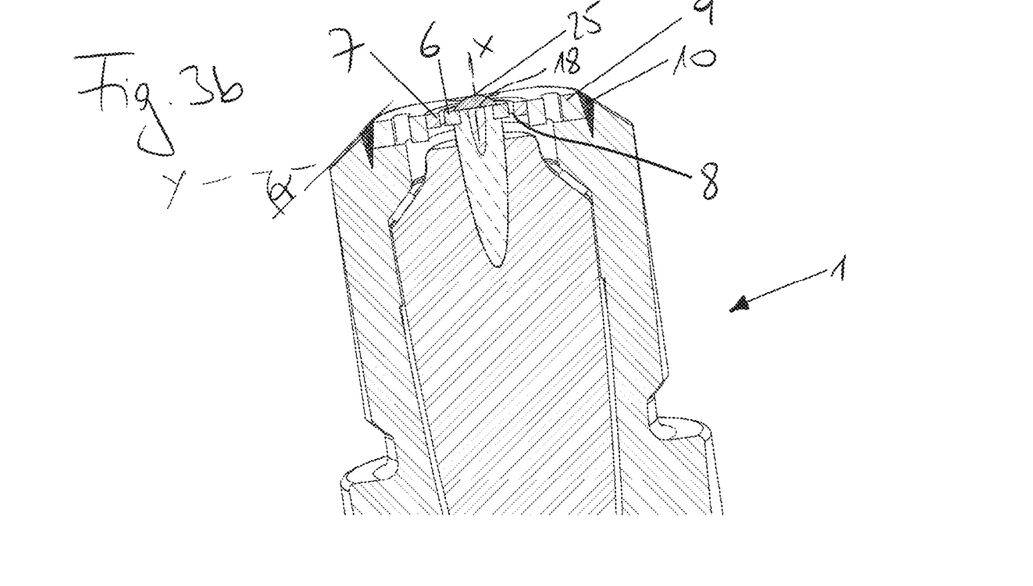

FIGS. 3*a* and 3*b* show an embodiment of a spark plug 1 according to the invention, wherein an end of the spark plug 1 facing the combustion chamber, when the spark plug 1 is mounted in the internal combustion engine, is shown in more detail.

The spark plug 1 comprises an ignition means 2 executed by a middle electrode 6 and a ground electrode 7, wherein there is a spark gap 8 between the middle electrode 6 and the ground electrode 7. The ground electrode 7 is arranged on the ground electrode carrier 9. In this specific embodiment, the wall 3, which surrounds the ignition means 4, is formed as part of the spark plug 1 body. The spark plug 1 body (e.g., wall 3) surrounds the ground electrode carrier 9, and the at least one ground electrode 7 is connected to the ground electrode carrier 9, e.g., by laser beam welding.

The weld seam 10 is preferably of the kind, that it is part of the chamfer. In such embodiments it may therefore be necessary, that the weld seam 10 is deep enough, so that the ground electrode carrier 9 is appropriately fixed by the weld seam 10.

The manufacturing method can comprise a step, in which a groove for the weld seam 10 is manufactured, in a depth, such that at least one part of the weld seam 10 acts as a connection between the ground electrode carrier 9 and the spark plug body, even after the manufacturing of the chamfer 5.

The middle electrode 6 is connected to the middle electrode carrier 13 by laser beam welding. The middle electrode carrier 13 (comprising or consisting of a metal, preferably Nickel) is arranged on an end of a center pin 20 which consists of a piece 19 of wire or rod having a core 21 and an outer layer 22 such that it contacts the core 21. Middle electrode carrier 13 and center pin 20 form an assembly according to the invention.

The center pin 20 is arranged inside an opening of an isolator 14, which is made, for example, of ceramic.

In order to seal the combustion chamber against the environment, in this embodiment, the spark plug 1 comprises a sealing area 4, which is designed as chamfer 5. This chamfer 5 is placed at the wall 3 (which is formed by the spark plug body in this embodiment). It should be noted that a center pin 20, according to an embodiment of the invention, can be used for all types of spark plugs 1, in particular, also for spark plugs 1 which are sealed against the environment as taught in the art.

The spark plug 1 body (e.g., wall 3) further comprises a mounting portion 11, for mounting the spark plug 1 in an internal combustion engine and/or in a cylinder head and/or in a spark plug sleeve. The mounting portion 11 is provided in this embodiment as (external) thread 12.

FIG. 1b shows an isometric view of a second embodiment similar to the embodiment of FIG. 1a. The only difference is that the weld seam 10 is not present in FIG. 1b.

It can be seen in FIG. 1b that the ground electrode 7 is designed as a ring electrode, wherein the ring electrode surrounds a circularly formed middle electrode 6 and an annular spark gap 8 is formed between the ground electrode 7 and the middle electrode 6.

Furthermore, in this embodiment, it can be seen that the chamfer 5 extends to the ground electrode carrier 9, with the advantage of an enhanced heat transfer between the spark plug body 3 and the spark plug sleeve as well as between the ground electrode carrier 9 and a spark plug sleeve.

The sealing area 4 in the form of the chamfer 5 is designed with an angle α with respect to a perpendicular y of a center axis x of the spark plug 1. This can be seen in more detail in FIG. 3b. The chamfer 5 can have an angle α in a wide range, e.g., between 20° and 45° with respect to the perpendicular y of a center axis x of the spark plug 1. When the spark plug 1 is mounted in a spark plug sleeve or directly in a cylinder head, the external thread 12 in conjunction with the internal thread of a spark plug sleeve or the cylinder head is configured to pre-load the chamfer 5 of the spark plug 1 against a surface of the spark plug sleeve or the cylinder head, respectively.

The spark plug 1 can be substantially symmetric with respect to a center axis x.

Figures 3C, 3D:
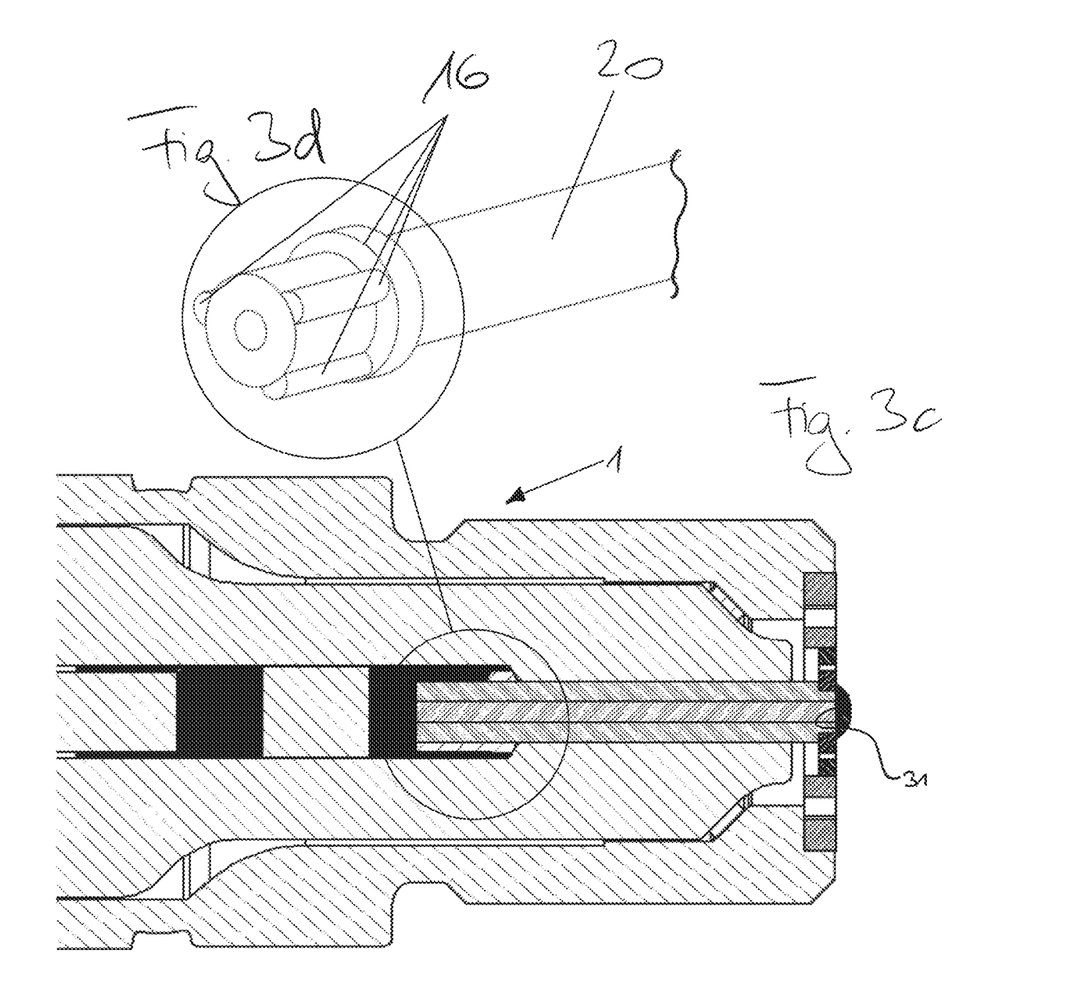

FIG. 3 shows a sectional view of a wire or rod suitable for an assembly according to an embodiment of the invention in which it can be seen that the wire or rod is formed as a clad wire or clad rod having a core 21 consisting of material (preferably comprising or consisting of Copper or a Copper alloy) with a higher thermal conductivity than that of the outer layer 22. The core 21 can consist of any material with high thermal conductivity, e.g., silver or gold. The outer layer 22 consists of a material (preferably comprising or consisting of Nickel) with a higher resistance against hot corrosion than that of the core 21.

Figure 4:
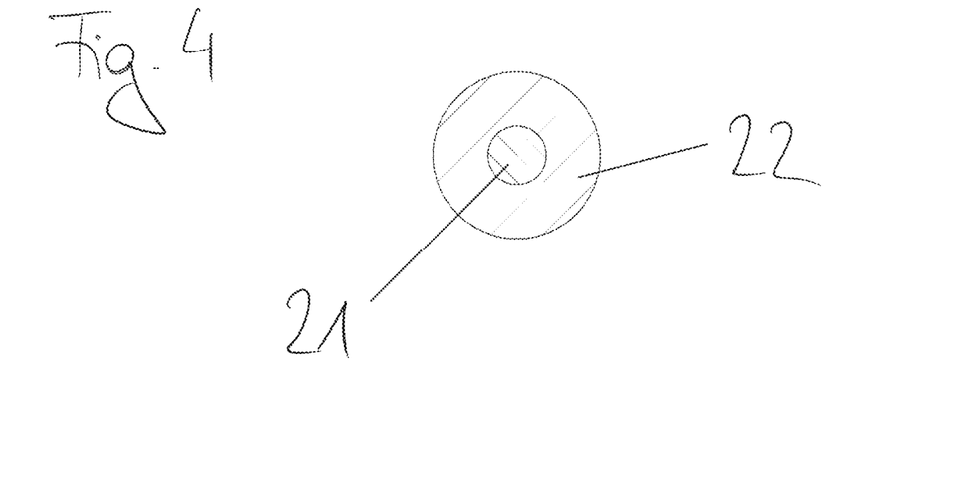
FIG. 4 is a sectional view of a wire or rod suitable for an assembly according to the invention.
Figure 5A:
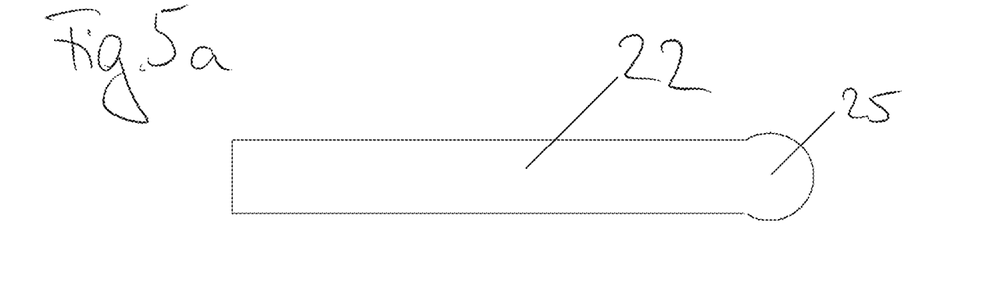
FIG. 5*a,b* is a side view and a sectional view of an assembly according to an embodiment of the invention in which a body has been formed on the wire or rod as an intermediate product.
Figure 5B:
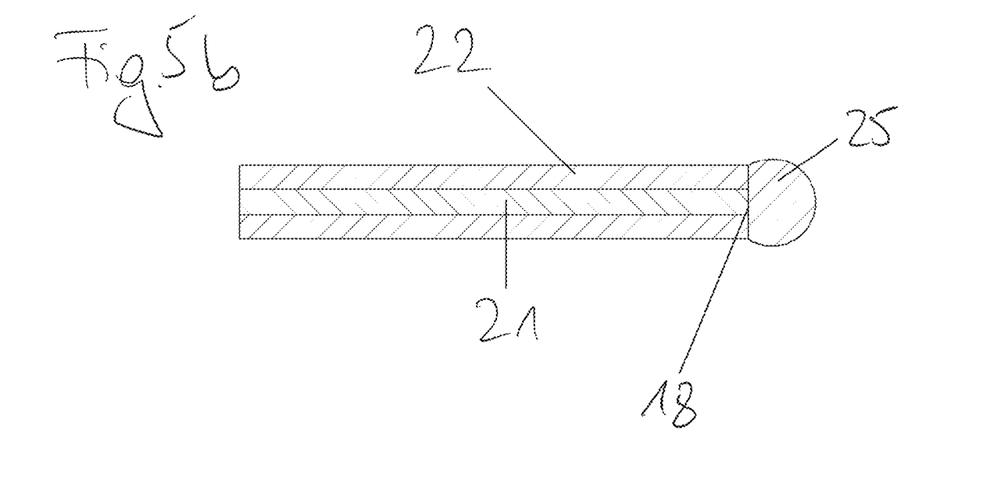
Figure 6:
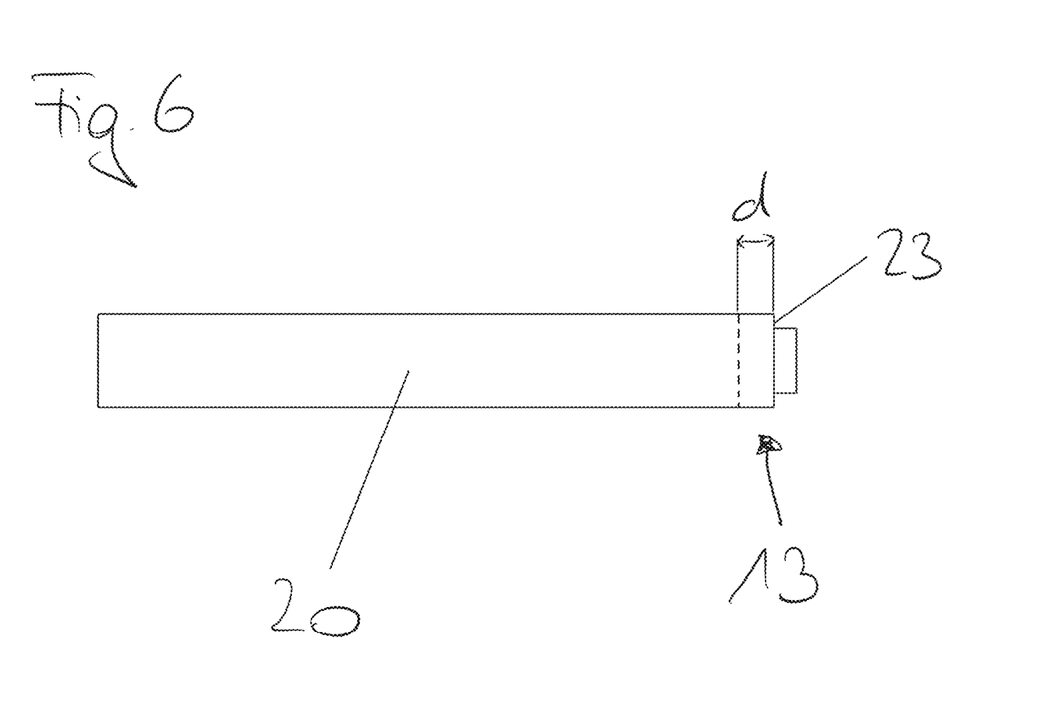
FIG. 6 is a side view of an assembly according to an embodiment of the invention.

FIG. 4a,b show a side view and a sectional view of an assembly according to an embodiment of the invention in which a body has been formed on the wire or rod as an intermediate product. Such a wire or rod can be obtained in a desired length, e.g., from a coil 27, preferably by cutting (cf. FIG. 6a). The first end of the piece 19 of wire or rod can be treated to make it more suitable for the following steps, e.g., by turning, milling, grinding or polishing.

It can be provided, that a center pin 20 consisting of a wire or rod can be manufactured by a drawing process. In this case, the core 21 with an exemplary diameter of e.g., 2-3 mm is introduced into the outer layer 22 (e.g., a tube with initial outer diameter of 5 mm and an inner diameter of 3.8 mm) in a first step. In a next step, said assembly is processed by a drawing method, resulting in a wire or rod with a core 21 and an outer layer 22 according to an embodiment of the invention. Such drawing processes are well known from the prior art. The resulting wire or rod can have a diameter of e.g., 3.8 mm, but of course all diameters are possible to be produced via this drawing technique. In a next step, the wire or rod can be processed as described above and below.

A powder deposition technique is used for forming the body on one end of the piece 19 of wire or rod i.e., the body is manufactured in at least one layer such that for each layer an unsolidified powder 26 (cf. FIG. 6b) is deposited on said one end of the piece 19 of wire and melted—preferably by a high energy beam (e.g., laser beam 24—cf. FIG. 6b—or electron beam)—and resolidifies into a (re-)solidified powder 25 to form the at least one layer.

As mentioned, the body serves as an intermediate product for the middle electrode carrier 13 and is of a larger dimension with respect to at least one direction, preferably with respect to a longitudinal axis of the wire or rod.

In a further manufacturing step (following FIG. 6c) for obtaining the middle electrode carrier 13 from the intermediate product material is removed from the body shown in this figure to obtain a body with reduced dimensions, preferably with dimensions corresponding to the ones of the middle electrode carrier 13 and having the desired predefined distance d between core 21 of the piece 19 of wire or rod and the mounting surface for the middle electrode carrier 13. The desired dimensions are shown in dashed line in FIG. 6c.

Figure 7A:
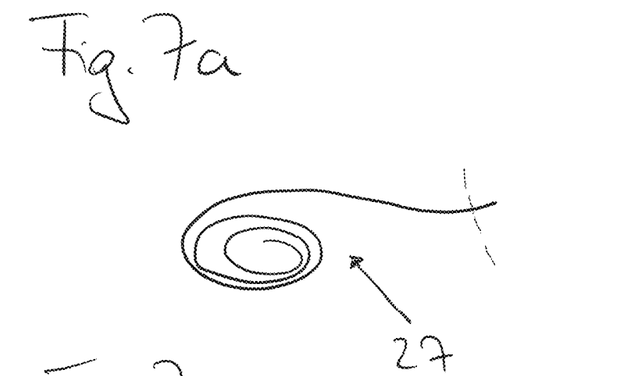
FIG. 7*a-c* is a schematic depiction of the steps in a method according to an embodiment of the invention.
Figure 7B:
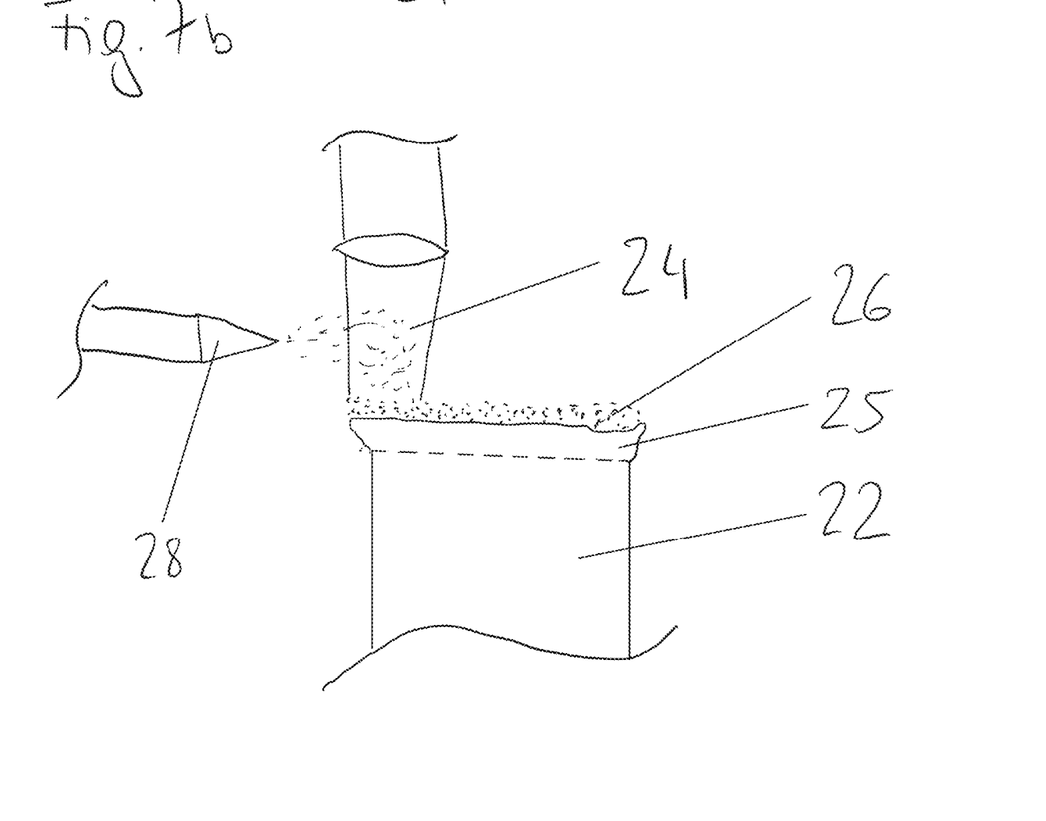
Figure 7C:
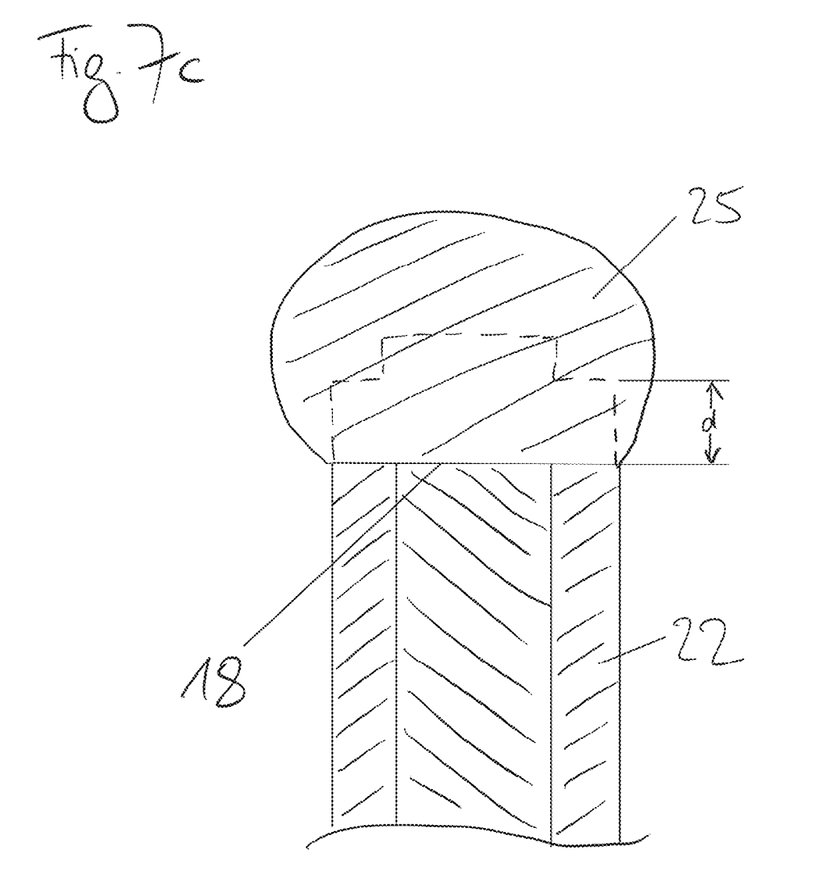
Figure 8:
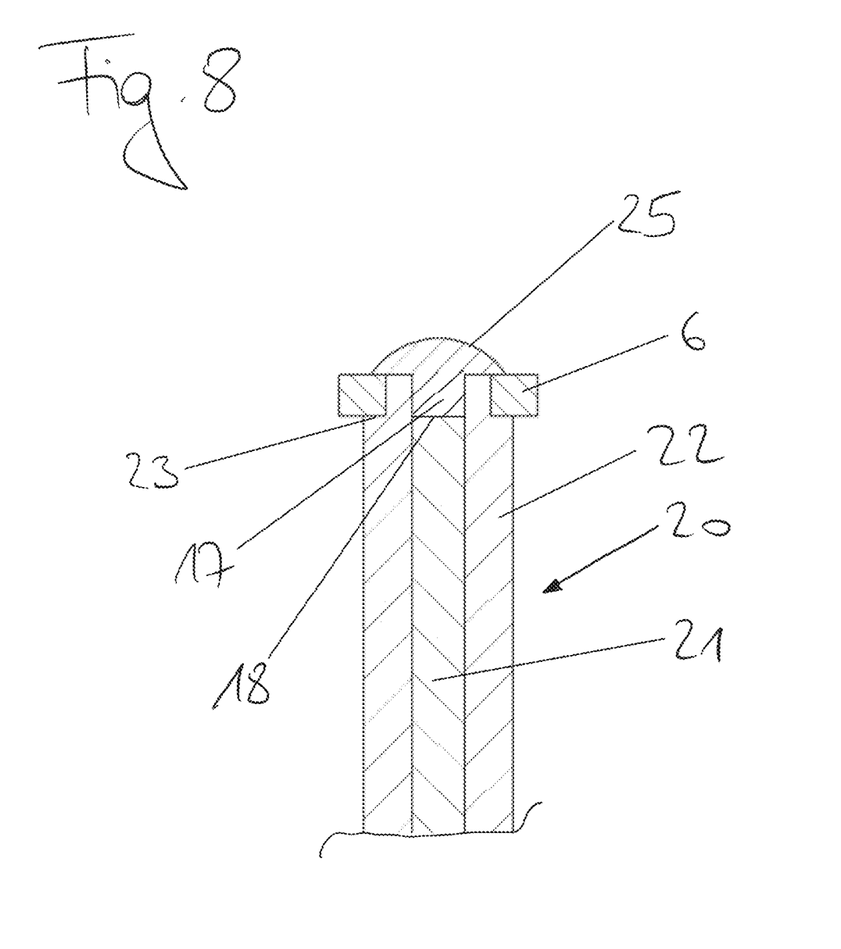
FIG. 8 is a sectional view of an embodiment of an assembly according to the invention and manufactured by an embodiment of an inventive method.

In the embodiment according to FIG. 7, it can be provided, that the wire or rod is fed to a manufacturing process, in which at least the outer layer 22 (it can be provided that also a small amount of the core diameter is removed, e.g., via turning or milling) is removed in the area of the one end of the wire or rod, preferably via turning or milling. In a next step, the layer with a thickness described above is applied to the un-coated part of the core 21 in the area of the one end via a powder deposition technique as described above. After this process—also leading to a shoulder in the area of the one end of the wire or rod—a middle electrode can be attached via e.g., a welding process.

Independent of the embodiment, the beneficial result is to positively influence the thermal conductivity due to the fact, that the distance between the middle electrode carrier 9 (and therefore to the middle electrode 6) and the core 21 can be properly defined.

LIST OF REFERENCE SIGNS 1 spark plug
2 ignition means
3 wall
4 sealing area
5 chamfer
6 middle electrode
7 ground electrode
8 spark gap
9 ground electrode carrier
10 weld seam
11 mounting portion
12 external thread
13 middle electrode carrier
14 isolator
15 powder nozzle
16 anti-rotation lock
17 indentation
18 contact region of the powder and the exposed core
19 piece of wire or rod
20 center pin
21 core
22 outer layer
23 shoulder
24 laser beam
25 (re-)solidified powder
26 (unsolidified) powder
27 coil of wire or rod
28 powder nozzle
d distance
x center axis of spark plug y perpendicular y of center axis of spark plug
α angle with respect to perpendicular of center axis of spark plug

The invention claimed is:

1. A method for manufacturing, comprising:
providing a center pin comprising a piece of wire or rod having, over its length, a core of a first material surrounded by an outer layer of a second material, wherein the second material is different from the first material, wherein the core has an exposed core portion at one end of the piece of wire or rod;
providing a middle electrode carrier or a middle electrode at the one end of the piece of wire or rod, wherein the middle electrode carrier or the middle electrode, respectively, is coupled to the outer layer at an interface; and
directing a high energy beam to the exposed core portion and a powder to melt the powder onto the exposed core portion, wherein, in a contact region of the powder and the exposed core portion, a microstructure composed of first material of the core and the powder is formed after resolidification of the first material of the core and the powder and the core is covered by resolidified powder at the one end of the piece of wire or rod, wherein powder is provided to cover the interface between the middle electrode carrier or the middle electrode, respectively, and the outer layer after resolidification, wherein the center pin, the middle electrode carrier, and the middle electrode are parts of a spark plug.

2. The method according to claim 1, wherein the middle electrode carrier or the middle electrode, respectively, is welded to the outer layer by forming a weld joint along the interface, before the powder is melted onto the exposed core portion.

3. The method according to claim 2, wherein powder is provided to cover the weld joint along the interface between the middle electrode carrier or the middle electrode, respectively, and the outer layer after resolidification.

4. The method according to claim 2, wherein before the powder is melted onto the exposed core portion, material is removed from the exposed core portion forming an indentation, which is filled by melted powder.

5. The method according to claim 1, wherein providing the middle electrode carrier or the middle electrode at the one end of the piece of wire or rod comprises attaching a body to or formed on the one end of the piece of wire or rod, wherein the body
either forms the middle electrode carrier or the middle electrode, respectively, or
serves as an intermediate product for the middle electrode carrier or the middle electrode, respectively, wherein the middle electrode carrier or the middle electrode is obtained from the intermediate product by at least one further manufacturing step.

6. The method according to claim 5, wherein the body serves as the intermediate product for the middle electrode carrier or the middle electrode, respectively, and is of a larger dimension with respect to at least one direction, with respect to a longitudinal axis of the wire or rod, and wherein the further manufacturing step for obtaining the middle electrode carrier or the middle electrode, respectively, from the intermediate product comprises at least one step in which material is removed from the body to obtain a body with reduced dimensions corresponding to the ones of the middle electrode carrier or the middle electrode, respectively.

7. The method according to claim 5, wherein the further manufacturing step for obtaining the middle electrode carrier from the intermediate product comprises forming a shoulder on the body.

8. The method according to claim 5, wherein the body forms the middle electrode carrier or the middle electrode, respectively, and is welded to the one end of the piece of wire or rod, wherein the body comprises a shoulder or the body is placed onto a shoulder disposed in the one end of the piece of wire or rod.

9. The method according to claim 5, wherein a mounting surface of the middle electrode carrier for the middle electrode or the middle electrode, respectively, has a pre-defined distance to the core with respect to a longitudinal axis of the wire or rod, wherein the pre-defined distance from the mounting surface of the middle electrode carrier to the core is obtained by using the body which is of a larger dimension at least with respect to the longitudinal axis of the wire or rod, and material of the body is removed along a direction parallel to the longitudinal axis of the wire or rod to form the pre-defined distance.

10. The method according to claim 1, further comprising at least one of:
the first material of the core has a higher thermal conductivity than the second material of the outer layer, wherein the core comprises Copper;
the second material of the outer layer has a higher resistance against hot corrosion than the first material of the core, wherein the outer layer comprises Nickel;
the middle electrode carrier comprises Nickel and the middle electrode comprises a precious metal.

11. The method according to claim 1, comprising assembling the spark plug including an assembly of the center pin, the middle electrode carrier, and the middle electrode of the spark plug.

12. A system, comprising:
a spark plug comprising an assembly of a center pin and an igniter, wherein the igniter comprises a middle electrode carrier or a middle electrode arranged at an end portion of the spark plug facing a combustion chamber, and the spark plug is configured to ignite a combustible air-fuel-mixture in the combustion chamber of an internal combustion engine;
a wall at least partially surrounding the igniter; and
a sealing area configured to seal the combustion chamber against an environment, wherein
the center pin comprises a piece of wire or rod having, over its length, a core of a first material surrounded by an outer layer of a second material, wherein the second material is different from the first material;
the middle electrode carrier or the middle electrode, respectively, is attached to one end of the piece of wire or rod;
the core of the center pin is covered by a material which was provided in form of melted powder and was resolidified such that in a contact region of the resolidified powder and the core a microstructure composed of material of the core and powder exists; and
the wall comprises the sealing area located at an end of the wall, wherein the end faces the combustion chamber when the spark plug is mounted in the internal combustion engine, wherein the sealing area is a terminal portion of the wall, wherein the terminal portion faces the combustion chamber, when the spark plug is mounted in the internal combustion engine, wherein the sealing area comprises a chamfer.

13. The system according to claim 12, comprising an anti-rotation lock on the center pin.

14. The system according to claim 12, comprising the internal combustion engine comprising the spark plug.

15. A system, comprising:
at least a portion of a spark plug of an internal combustion engine, wherein the portion comprises:
a central pin having a core extending along a longitudinal axis and an outer layer surrounding the core along the longitudinal axis, wherein the core comprises a first material that is different from a second material of the outer layer;
an electrode and/or an electrode carrier coupled to an end portion of the central pin; and
a cover layer disposed over an axial end of the core along a contact region, wherein the cover layer comprises a microstructure composed of the first material of the core and a third material, wherein the portion of the spark plug comprises at least one of:
the cover layer completely covers the core to the outer layer;
the cover layer extends over an interface between the outer layer and the electrode and/or the electrode carrier; or
the electrode and/or the electrode carrier is disposed against a recessed shoulder in the outer layer or the cover layer at the end portion.

16. The system of claim 15, wherein the cover layer completely covers the core to the outer layer.

17. The system of claim 16, wherein the cover layer comprises an outwardly curved dome shape.

18. The system of claim 15, wherein the cover layer extends over the interface between the outer layer and the electrode and/or the electrode carrier.

19. The system of claim 15, wherein the electrode and/or the electrode carrier is disposed against the recessed shoulder in the outer layer at the end portion.

20. The system of claim 15, wherein the electrode and/or the electrode carrier is disposed against the recessed shoulder in the cover layer at the end portion.

21. The system of claim 15, comprising the spark plug having the portion, the internal combustion engine having one or more of the spark plug, or a combination thereof.

22. A method for manufacturing, comprising:
coupling an electrode and/or an electrode carrier coupled to an end portion of a central pin of a spark plug, wherein the central pin has a core extending along a longitudinal axis and an outer layer surrounding the core along the longitudinal axis, and the core comprises a first material that is different from a second material of the outer layer;
forming a cover layer over an axial end of the core along a contact region, wherein the cover layer comprises a microstructure composed of the first material of the core and a third material, wherein the forming comprises at least one of:
the cover layer completely covers the core to the outer layer;
the cover layer extends over an interface between the outer layer and the electrode and/or the electrode carrier; or
the electrode and/or the electrode carrier is disposed against a recessed shoulder in the outer layer or the cover layer at the end portion.

23. The method of claim 22, wherein forming comprises directing a high energy beam to melt a powder of the third material onto the axial end of the core, wherein the microstructure is formed after resolidification of the first material of the core and the third material of the powder.

24. The method of claim 22, wherein the cover layer completely covers the core to the outer layer.

25. The method of claim 22, wherein the cover layer extends over the interface between the outer layer and the electrode and/or the electrode carrier.

26. The method of claim 22, wherein the electrode and/or the electrode carrier is disposed against the recessed shoulder in the outer layer at the end portion.

27. The method of claim 22, wherein the electrode and/or the electrode carrier is disposed against the recessed shoulder in the cover layer at the end portion.

* * * * *